(12) United States Patent
Saggar et al.

(10) Patent No.: US 11,616,594 B2
(45) Date of Patent: Mar. 28, 2023

(54) UTILIZING PADDING DURATION AT START OF A HALF SUBFRAME

(71) Applicant: QUALCOMM Incorporated, San Diego, CA (US)

(72) Inventors: Hemant Saggar, Irvine, CA (US); Iyab Issam Sakhnini, San Diego, CA (US); Xiaoxia Zhang, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/302,467

(22) Filed: May 4, 2021

(65) Prior Publication Data

US 2022/0360361 A1    Nov. 10, 2022

(51) Int. Cl.
*H04L 1/00* (2006.01)
*H04L 27/26* (2006.01)
(Continued)

(52) U.S. Cl.
CPC ........ *H04L 1/0007* (2013.01); *H04L 27/2605* (2013.01); *H04W 52/18* (2013.01); *H04W 72/044* (2013.01); *H04W 72/12* (2013.01)

(58) Field of Classification Search
None
See application file for complete search history.

(56) References Cited

U.S. PATENT DOCUMENTS 9,544,171 B2 * 1/2017 Berardinelli ........ H04L 27/2607
10,728,072 B2    7/2020 Islam et al.
(Continued)

FOREIGN PATENT DOCUMENTS

| EP | 3301986 A1 * | 4/2018 | ........ H04W 28/0278 |
| EP | 3488576 A1 * | 5/2019 | ............ H04L 27/26 |
| WO | WO-2018035489 A1 * | 2/2018 | |

OTHER PUBLICATIONS

Intel Corporation: "Time Interval Alignment Between Different Numerologies", 3GPP TSG RAN WG1 Meeting #86, R1-166553, NR Time Interval Alignment, 3GPP, Mobile Competence Centre, 650, Route Des Lucioles, F-06921, Sophia-Antipolis Cedex, France, vol. RAN WG1, No. Gothenburg, Sweden, Aug. 22, 2016-Aug. 26, 2016, 5 Pages, Aug. 21, 2016, XP051125445, Aug. 13, 2016, 5 Pages, figure 1b, Proposal 1, Proposal 2, p. 2-p. 3.
International Search Report and Written Opinion—PCT/US2022/071554—ISA/EPO—dated Sep. 22, 2022.
Partial International Search Report—PCT/US2022/071554—ISA/EPO—dated Sep. 28, 2022.

*Primary Examiner* — Anh Vu H Ly
(74) *Attorney, Agent, or Firm* — Harrity & Harrity LLP

(57) ABSTRACT

In a wireless network, a frame structure may include a padding duration at the start of every half subframe to ensure that an integer number of symbols fit within a duration of the half subframe. In some aspects, to avoid wasting time domain resources, the padding duration may be utilized for other purposes. For example, because a single carrier waveform is not bound to a fixed Fast Fourier Transform size, a wireless node may use the padding duration to transmit a single carrier symbol that has a shorter length than a full symbol associated with a subcarrier spacing. Additionally, or alternatively, in cases where a wireless node is configured to transmit or receive a signal in a first symbol of a half subframe that is associated with a different power level than a preceding symbol, the padding duration may be used to adapt a transmit power or a receive gain.

17 Claims, 13 Drawing Sheets

(51) Int. Cl.
*H04W 52/18* (2009.01)
*H04W 72/044* (2023.01)
*H04W 72/12* (2023.01)

(56) References Cited

U.S. PATENT DOCUMENTS

| | | | |
|---|---|---|---|
| 11,012,280 B2 * | 5/2021 | Moroga | H04L 27/2647 |
| 2018/0091267 A1 * | 3/2018 | Kim | H04L 27/26025 |
| 2019/0306855 A1 | 10/2019 | Tiirola et al. | |
| 2021/0328843 A1 * | 10/2021 | Gurelli | H04L 27/26025 |
| 2022/0158883 A1 * | 5/2022 | Afshang | H04L 27/26025 |
| 2022/0217032 A1 * | 7/2022 | Ko | H04L 27/26025 |
| 2022/0322117 A1 * | 10/2022 | Choi | H04W 24/08 |

\* cited by examiner

500
Symbol, CP, and padding duration up to 240 kHz SCS

| SCS | Symbols per half subframe | Symbol length | Normal CP length | Extra padding length |
|---|---|---|---|---|
| 15 kHz | 7 | 66.67 μsec | 4.69 μsec | 0.52 μsec |
| 30 kHz | 14 | 33.3 μsec | 2.34 μsec | 0.52 μsec |
| 60 kHz | 28 | 16.7 μsec | 1.17 μsec | 0.52 μsec |
| 120 kHz | 56 | 8.33 μsec | 0.59 μsec | 0.52 μsec |
| 240 kHz | 112 | 4.17 μsec | 0.29 μsec | 0.52 μsec |

505 Extra padding duration exceeds a CP

550
Symbol, CP, and padding duration at higher SCS

| SCS | NFFT | Max BW | Chip duration | Symbol length | Normal CP + Extra padding length |
|---|---|---|---|---|---|
| 480 kHz | 4096 | 1.97 GHz | Tc | 4096Tc | 288Tc + 1024Tc |
| 960 kHz | 4096 | 3.93 GHz | Tc/2 | 2048Tc | 144Tc + 1024Tc |
| 1920 kHz | 4096 | 7.86 GHz | Tc/4 | 1024Tc | 72Tc + 1024Tc |
| 3840 kHz | 4096 | 15.73 GHz | Tc/8 | 512Tc | 36Tc + 1024Tc |

555 Extra padding duration equals or exceeds a full symbol

UTILIZING PADDING DURATION AT START OF A HALF SUBFRAME

FIELD OF THE DISCLOSURE

Aspects of the present disclosure generally relate to wireless communication and to techniques and apparatuses for utilizing a padding duration at the start of a half subframe.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a wireless network, a frame structure may include a padding duration at the start of every half subframe to ensure that an integer number of symbols fit within a duration of the half subframe. For example, one subframe typically has a duration of one (1) millisecond (ms), and the first symbol in each half subframe may include an excess cyclic prefix with a fixed padding duration of 0.52 microseconds (µs) to ensure that, within any subcarrier spacing, an integer number of symbols with a fifteen (15) kilohertz (kHz) numerology can fit within the 0.5 ms duration of the half subframe. In general, the number of symbols that can fit within the 0.5 ms duration of the half subframe proportionately scale to higher subcarrier spacings (e.g., seven (7) symbols fit within the 0.5 ms duration of a half subframe for a 15 kHz subcarrier spacing, fourteen (14) symbols fit within the 0.5 ms duration of a half subframe for a 30 kHz subcarrier spacing, twenty-eight (28) symbols fit within the 0.5 ms duration of a half subframe for a 60 kHz subcarrier spacing, and so on). Accordingly, because the extra padding duration at the start of every half subframe has a fixed length of 0.52 µs regardless of the subcarrier spacing, the padding duration may exceed the length of a normal cyclic prefix at a subcarrier spacing of 240 kHz or above and may equal or exceed a full symbol length at a subcarrier spacing of 1920 kHz or above. As a result, because the extra padding duration represents unused resources in a time domain (other than to ensure that an integer number of symbols fit within a half subframe), the extra padding duration can cause significant wasted overhead, especially at higher carrier frequencies where the padding duration can approach or exceed a cyclic prefix and/or a symbol length.

Some aspects described herein relate to techniques and apparatuses to utilize the padding duration at the start of a half subframe to avoid wasting resources in a time domain. For example, in some aspects, a wireless network may support communication using orthogonal frequency-division multiplexing (OFDM) waveforms and single carrier waveforms. For example, the OFDM waveform may provide high spectral efficiency, facilitate higher-order multiple-input multiple-output (MIMO) operations to achieve high data rates, and/or provide backward compatibility with different frequency ranges, and the single carrier waveform may be associated with a lower peak-to-average power ratio (PAPR), a reduced effect of phase noise, and/or improved coverage relative to the OFDM waveform. Furthermore, the single carrier waveform may enable a time domain implementation without mandating a Fast Fourier Transform (FFT) or inverse FFT (IFFT) operation, whereby a single carrier waveform is not bound to a fixed FFT size. In some aspects, a wireless node may therefore use the padding duration to transmit a single carrier symbol having a duration that is shorter than a full symbol length associated with a given subcarrier spacing. For example, as described herein, the single carrier symbol may be preceded by a guard interval that has a duration equal to a cyclic prefix, and the guard interval and the single carrier symbol may have a combined duration that is equal to the full symbol length for a given subcarrier spacing.

In this way, using the padding duration to transmit a shortened single carrier symbol may increase utilization of time domain resources and/or allow a latency-sensitive transmission to be transmitted earlier in a half subframe while ensuring that another node receiving the shortened single carrier symbol can use a fixed FFT size (e.g., 4096, or 4K) to process the shortened single carrier symbol. Furthermore, because the duration of the guard interval is equal to the cyclic prefix and the combined duration of the guard interval and the single carrier symbol equal the full symbol length for a given subcarrier spacing, the transmission of the single carrier symbol in the padding duration may be aligned with OFDM subframe boundaries, which enables a wireless network to dynamically switch a waveform allocated to a UE at regular intervals and/or enables network flexibility to reallocate time and frequency resources among single carrier and OFDM/DFT-s-OFDM users at regular intervals, thereby improving resource utilization efficiency.

Additionally, or alternatively, in cases where a signal that a wireless node is configured to transmit or receive in a first symbol of a half subframe is associated with a different power level than a preceding symbol, the padding duration may be used to adapt a transmit power or a receive gain. For example, in some aspects, a power change event may be triggered when a base station requests that a UE transmit using a higher power or a lower power on certain data symbols based on a modulation and coding scheme (MCS), when a UE adjusts an automatic gain control to adjust to higher or lower received power, interference, and/or noise, and/or when a UE retransmits a random access channel with an increased transmit power, among other examples. Accordingly, in some aspects, a wireless node may be configured to effectuate a power change (e.g., an adjustment to a transmit power and/or a receive gain) in the padding duration at the start of a half subframe such that power transients may occur in the padding duration while transmit and/or receive power is being stabilized by communication hardware. Furthermore, utilizing the padding duration to adapt a transmit power or a receive gain can provide an additional 0.52 µs to handle power transients, which can represent a significant time savings that may assist with satisfying a timing requirement for a power transition.

In some aspects, a wireless node for wireless communication includes a memory and one or more processors, coupled to the memory, configured to determine a symbol length based at least in part on a subcarrier spacing associated with a carrier frequency; and transmit a single carrier symbol having a duration that is shorter than the symbol length in a padding duration at a start of a first symbol in a half subframe.

In some aspects, a wireless node for wireless communication includes a memory and one or more processors, coupled to the memory, configured to determine that a signal scheduled in a first symbol in a half subframe is associated with a different power level than a preceding symbol in time; and operate at the different power level in a padding duration at a start of the first symbol in the half subframe.

In some aspects, a method of wireless communication performed by a wireless node includes determining a symbol length based at least in part on a subcarrier spacing associated with a carrier frequency; and transmitting a single carrier symbol having a duration that is shorter than the symbol length in a padding duration at a start of a first symbol in a half subframe.

In some aspects, a method of wireless communication performed by a wireless node includes determining that a signal scheduled in a first symbol in a half subframe is associated with a different power level than a preceding symbol in time; and operating at the different power level in a padding duration at a start of the first symbol in the half subframe.

In some aspects, an apparatus for wireless communication includes means for determining a symbol length based at least in part on a subcarrier spacing associated with a carrier frequency; and means for transmitting a single carrier symbol having a duration that is shorter than the symbol length in a padding duration at a start of a first symbol in a half subframe.

In some aspects, an apparatus for wireless communication includes means for determining that a signal scheduled in a first symbol in a half subframe is associated with a different power level than a preceding symbol in time; and means for operate at the different power level in a padding duration at a start of the first symbol in the half subframe.

In some aspects, a non-transitory computer-readable medium storing a set of instructions for wireless communication includes one or more instructions that, when executed by one or more processors of a wireless node, cause the wireless node to determine a symbol length based at least in part on a subcarrier spacing associated with a carrier frequency; and transmit a single carrier symbol having a duration that is shorter than the symbol length in a padding duration at a start of a first symbol in a half subframe.

In some aspects, a non-transitory computer-readable medium storing a set of instructions for wireless communication includes one or more instructions that, when executed by one or more processors of a wireless node, cause the wireless node to determine that a signal scheduled in a first symbol in a half subframe is associated with a different power level than a preceding symbol in time; and operate at the different power level in a padding duration at a start of the first symbol in the half subframe.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 5 is a diagram illustrating examples of symbol, cyclic prefix, and padding durations associated with different subcarrier spacings.

DETAILED DESCRIPTION

Figure 1:
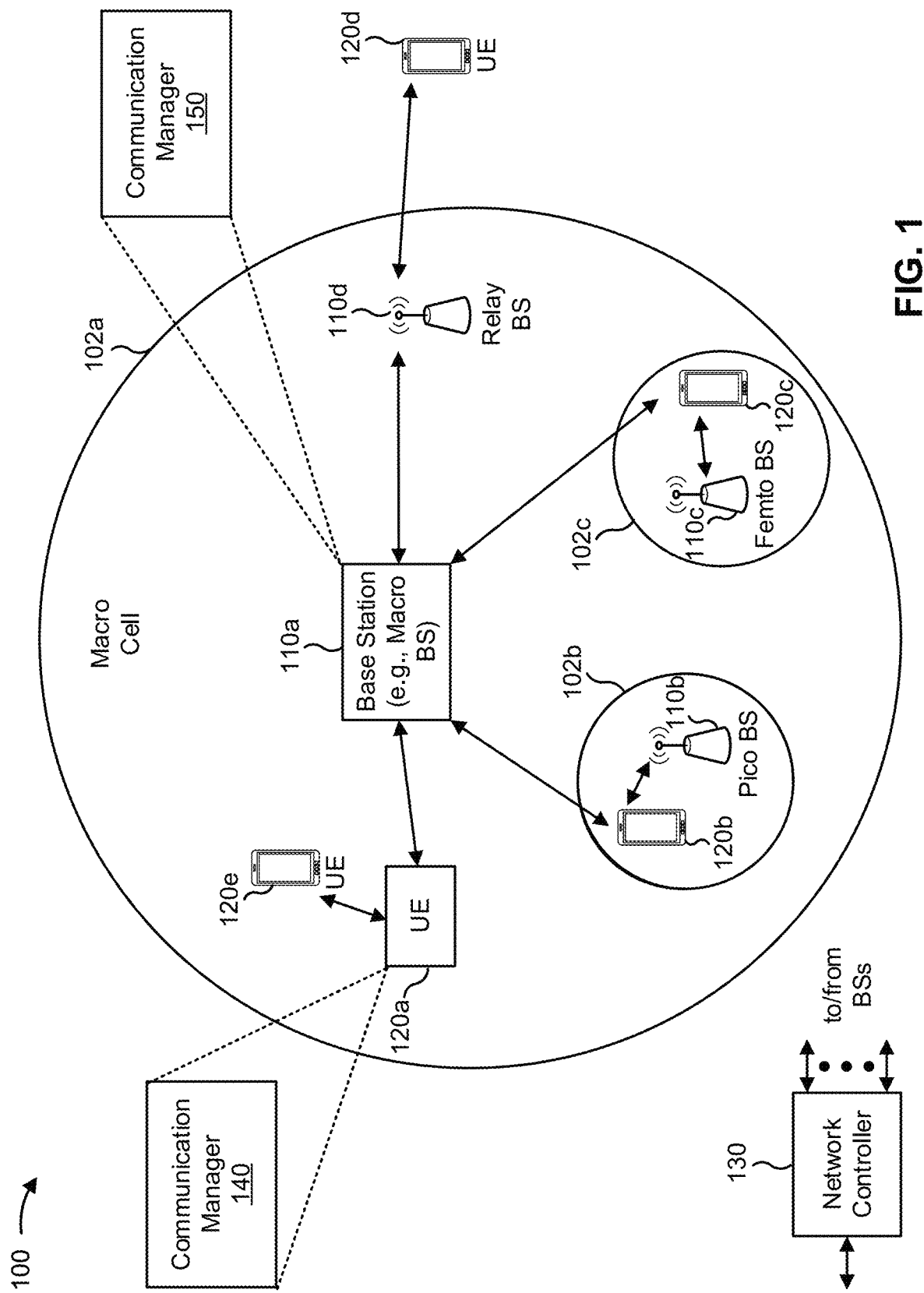
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4), which may span from 52.6 GHz to 114.25 GHz, and/or may communicate using an operating band having a fifth frequency range (FR5), which may include frequencies higher than 114.25 GHz (e.g., sub-terahertz). Note that FR3 is between FR1 and FR2, and FR4 and FR5 are above FR2. The frequencies between FR1 and FR2 (e.g., in FR3) are sometimes referred to as mid-band or "sub-centimeter wave" frequencies. Although a portion of FR1 is greater than 6 GHz, FR1 is often referred to as a "sub-6 GHz" band. Similarly, FR2 and FR4 are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, FR4, and/or FR5, and/or mid-band frequencies (e.g., less than 24.25 GHz). It is contemplated that the frequencies included in FR1, FR2, FR3, FR4, and/or FR5 may be modified, and techniques described herein are applicable to those modified frequency ranges.

In some aspects, the UE 120 may include a communication manager 140. As described in more detail elsewhere herein, the communication manager 140 may determine a symbol length based at least in part on a subcarrier spacing associated with a carrier frequency; and transmit a single carrier symbol having a duration that is shorter than the symbol length in a padding duration at a start of a first symbol in a half subframe. Additionally, or alternatively, the communication manager 140 associated with the UE 140 may determine that a signal scheduled in a first symbol in a half subframe is associated with a different power level than a preceding symbol in time; and operate at the different power level in a padding duration at a start of the first symbol in the half subframe. Additionally, or alternatively, the communication manager 140 may perform one or more other operations described herein.

In some aspects, the base station 110 may include a communication manager 150. As described in more detail elsewhere herein, the communication manager 150 may determine a symbol length based at least in part on a subcarrier spacing associated with a carrier frequency; and transmit a single carrier symbol having a duration that is shorter than the symbol length in a padding duration at a start of a first symbol in a half subframe. Additionally, or alternatively, the communication manager 150 associated with the base station 110 may determine that a signal scheduled in a first symbol in a half subframe is associated with a different power level than a preceding symbol in time; and operate at the different power level in a padding duration at a start of the first symbol in the half subframe. Additionally, or alternatively, the communication manager 150 may perform one or more other operations described herein.

As indicated above, FIG. 1 is provided as an example. Other examples may differ from what is described with regard to FIG. 1.

Figure 2:
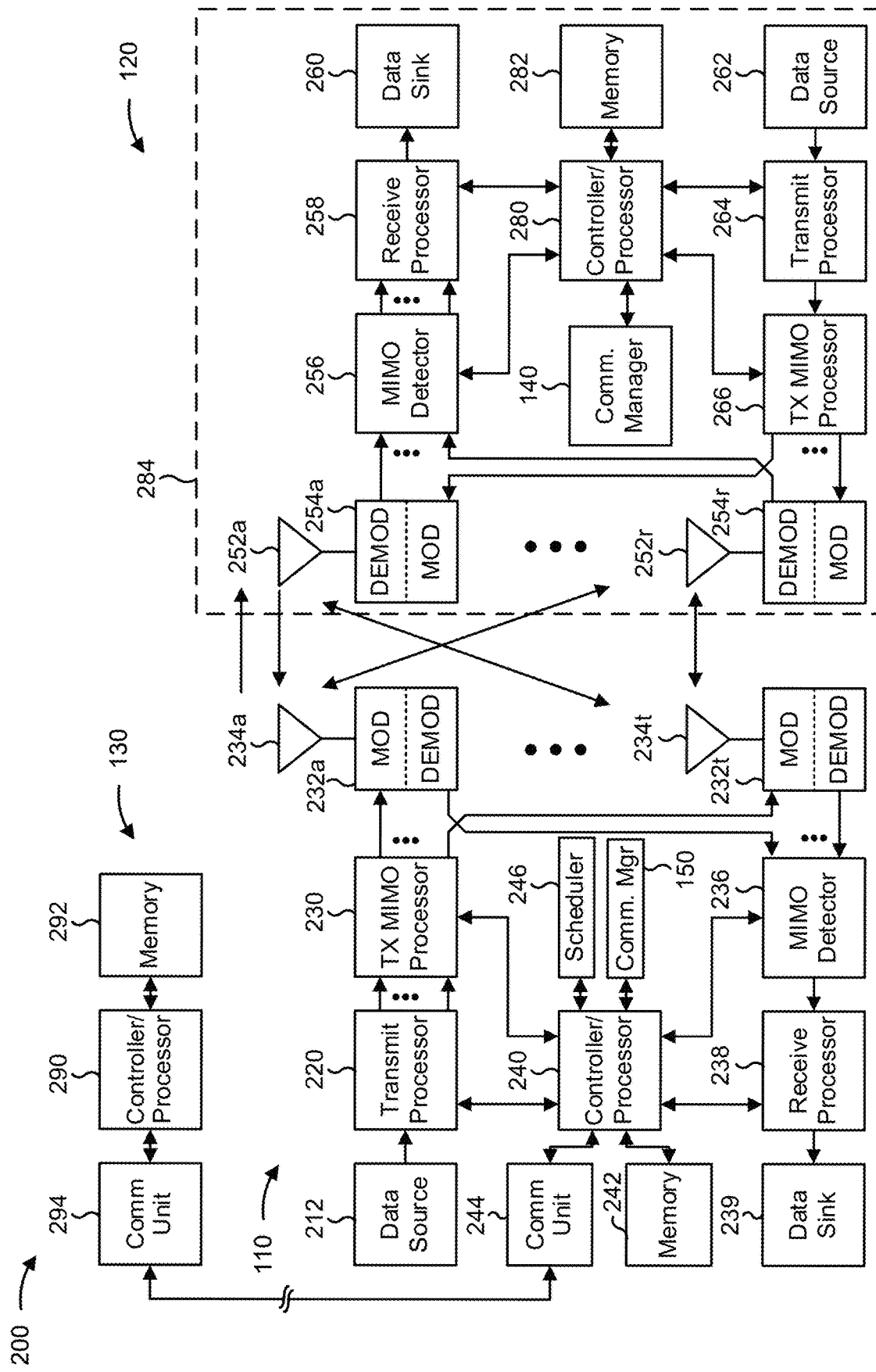
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with utilizing a padding duration at the start of a half subframe, as described in more detail elsewhere herein. In some aspects, a wireless node as described herein is the base station 110, is included in the base station 110, or includes one or more components of the base station 110 shown in FIG. 2. Additionally, or alternatively, a wireless node as described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, method 800 of FIG. 8, method 900 of FIG. 9, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 800 of FIG. 8, method 900 of FIG. 9, and/or other processes as described herein. In some aspects, executing instructions may include running the instructions, converting the instructions, compiling the instructions, and/or interpreting the instructions, among other examples.

In some aspects, a wireless node includes means for determining a symbol length based at least in part on a subcarrier spacing associated with a carrier frequency; and/or means for transmitting a single carrier symbol having a duration that is shorter than the symbol length in a padding duration at a start of a first symbol in a half subframe. In some aspects, the means for the wireless node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. Additionally, or alternatively, the means for the wireless node to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a wireless node includes means for determining that a signal scheduled in a first symbol in a half subframe is associated with a different power level than a preceding symbol in time; and/or means for operating at the different power level in a padding duration at a start of the first symbol in the half subframe. In some aspects, the means for the wireless node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. Additionally, or alternatively, the means for the wireless node to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
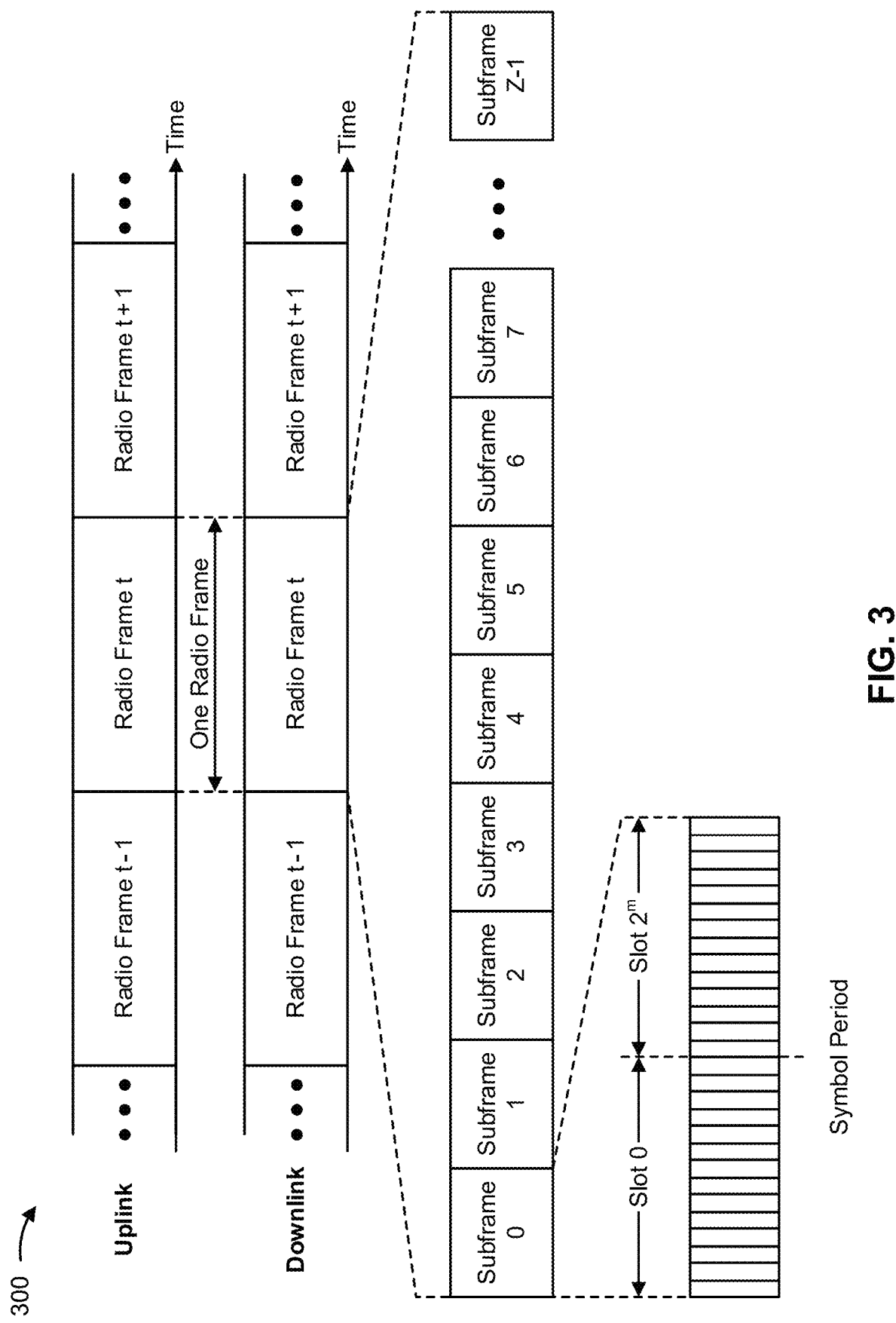
FIG. 3 is a diagram illustrating an example of a frame structure in a wireless communication network.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

In general, the frame structure may include a padding duration at the start of every half subframe to ensure that an integer number of symbols fit within a duration of the half subframe. For example, as described above, one subframe typically has a duration of one (1) ms, and the first symbol in each half subframe may include an excess cyclic prefix with a fixed padding duration of 0.52 microseconds (µs) to ensure that an integer number of symbols with a fifteen (15) kilohertz (kHz) numerology can fit within the 0.5 ms duration of the half subframe. In general, the number of symbols that can fit within the 0.5 ms duration of the half subframe proportionately scale to higher subcarrier spacings (e.g., fourteen (14) symbols fit within the 0.5 ms duration of a half subframe for a 30 kHz subcarrier spacing, twenty-eight (28) symbols fit within the 0.5 ms duration of a half subframe for a 60 kHz subcarrier spacing, and so on). Accordingly, because the extra padding duration at the start of every half subframe has a fixed length of 0.52 µs regardless of the subcarrier spacing, the padding duration may exceed the length of a normal cyclic prefix at a subcarrier spacing of 240 kHz or above and may equal or exceed a full symbol length at a subcarrier spacing of 1920 kHz or above. As a result, because the extra padding duration represents unused resources in a time domain (other than to ensure that an integer number of symbols fit within a half subframe), the extra padding duration can cause significant wasted overhead, especially at higher carrier frequencies.

Some aspects described herein relate to techniques and apparatuses to utilize the padding duration at the start of a half subframe in order to avoid or reduce wasted time domain resources. For example, in some aspects, a wireless network may support communication using an orthogonal frequency-division multiplexing (OFDM) waveform that can provide high spectral efficiency and facilitate higher-order MIMO operations to achieve high data rates and/or a single carrier waveform that can reduce a peak-to-average power ratio (PAPR) to improve coverage. Furthermore, the single carrier waveform may also enable a time domain implementation without mandating a Fast Fourier Transform (FFT) or inverse FFT (IFFT) operation. Accordingly, because a single carrier waveform is not bound to a fixed FFT size, a wireless node may use the padding duration to transmit a single carrier symbol that has a shorter length than a full symbol associated with a subcarrier spacing. For example, as described in more detail below with reference to FIGS. 6A-6B, the single carrier symbol may be preceded by a guard interval having a duration equal to a cyclic prefix, and the guard interval and the single carrier symbol may have a combined duration equal to the full symbol length for a given subcarrier spacing. In this way, using the padding duration to transmit a shortened single carrier symbol may increase utilization of time domain resources and/or allow a latency-sensitive transmission to be transmitted earlier in a half subframe while ensuring that another node receiving the shortened single carrier symbol can use a fixed FFT size (e.g., 4096, or 4K) to process the shortened single carrier symbol.

Additionally, or alternatively, in cases where a signal that a wireless node is configured to transmit or receive in a first symbol of a half subframe is associated with a different power level than a preceding symbol, the padding duration may be used to adapt a transmit power or a receive gain. For example, as described in more detail below with reference to FIG. 7, a power change event may be triggered when a base station requests that a UE transmit using a higher power or a lower power on certain data symbols based on an MCS, when a UE adjusts an automatic gain control (AGC) to adjust to higher or lower received power, interference, and/or noise, and/or when a UE retransmits a random access channel (RACH) with an increased transmit power, among other examples. Accordingly, in some aspects, a wireless node may be configured to effectuate a power change (e.g., an adjustment to a transmit power and/or a receive gain) in the padding duration at the start of a half subframe such that power transients may occur in the padding duration while transmit and/or receive power is being stabilized by communication hardware. Furthermore, utilizing the padding duration to adapt a transmit power or a receive gain can provide an additional 0.52 μs to handle power transients, which can represent a significant time savings that may assist with satisfying a timing requirement for a power transition. For example, a wireless network may require that a power transition for an uplink signal (e.g., a physical RACH (PRACH), a sounding reference signal (SRS), a physical uplink control channel (PUCCH), and/or a physical uplink shared channel (PUSCH)) has to occur within 5 μs for FR2 or within 10 μs for FR1, whereby using the 0.52 μs padding duration to handle a power transient may increase the time to adapt uplink transmit power by ~10% for FR2 or ~5% for FR1).

As indicated above, FIG. 3 is provided as an example. Other examples may differ from what is described with respect to FIG. 3.

Figure 4:
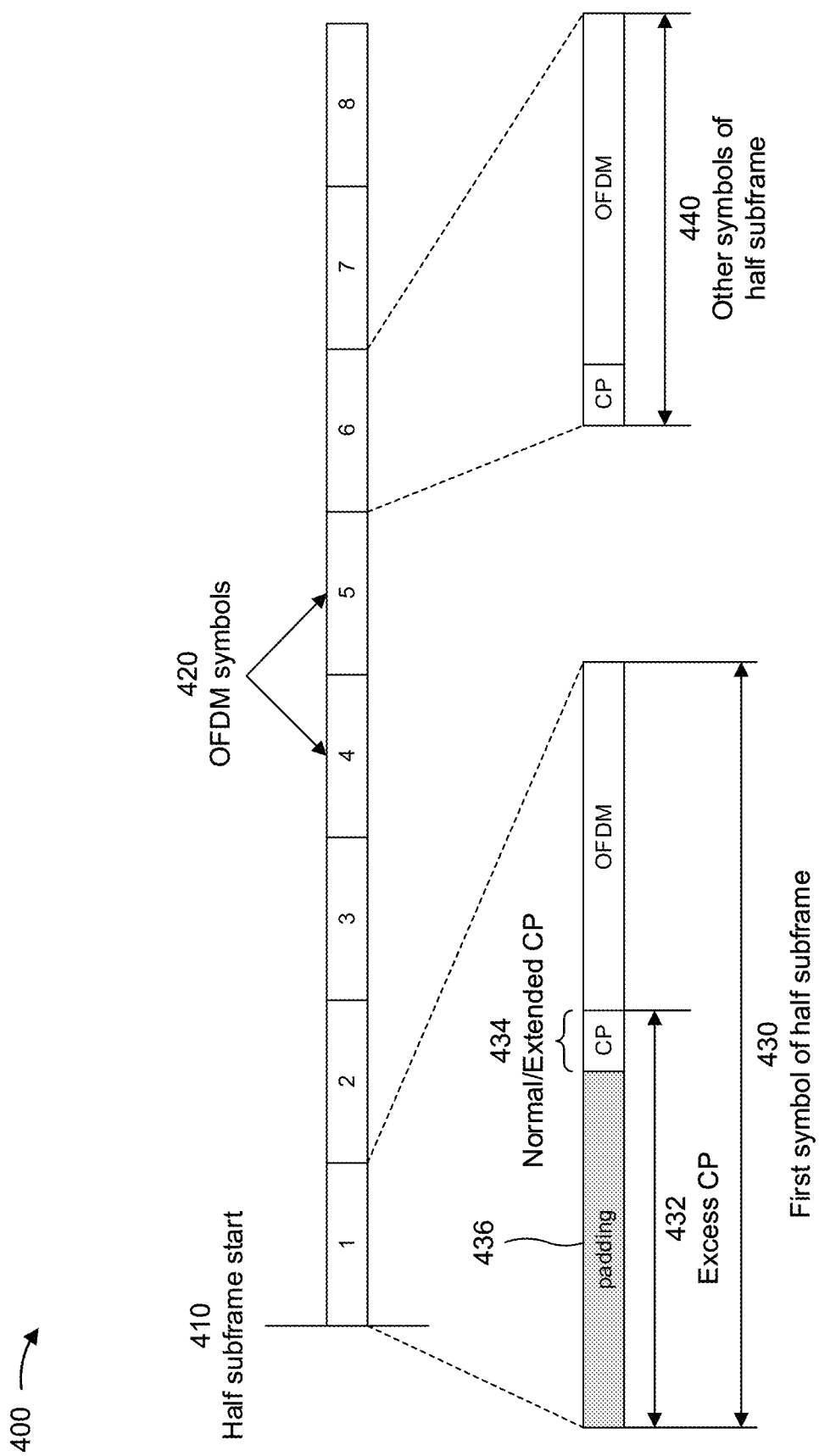
FIG. 4 is a diagram illustrating an example of a half subframe that includes an excess cyclic prefix with a padding duration at the start of a first symbol.

FIG. 4 is a diagram illustrating an example 400 of a half subframe that includes an excess cyclic prefix with a padding duration at the start of a first symbol. For example, a half subframe 410 may start according to a fixed periodicity (e.g., every 0.5 ms), and each half subframe 410 may include an integer number of OFDM symbols 420 based on a subcarrier spacing (or numerology) associated with a carrier frequency. For example, carrier frequencies in FR1 may be associated with a subcarrier spacing of 15 kHz, 30 kHz, 60 kHz, 120 kHz, or 240 kHz, while a larger subcarrier spacing (e.g., 480 kHz, 960 kHz, 1920 kHz, 3840 kHz, or higher) may be needed at higher carrier frequencies (e.g., in FR4) to support a larger bandwidth with the same FFT size as lower frequency bands. In general, a lower subcarrier spacing may be associated with a shorter symbol length, a half subframe 410 may be structured to fit an integer number of OFDM symbols 420 with a 15 kHz subcarrier spacing (e.g., seven (7) OFDM symbols in a half subframe 410 having a 0.5 ms duration based on a symbol length of 66.67 μs and a normal cyclic prefix length of 4.69 μs), which proportionately scales to larger subcarrier spacings.

Accordingly, in order to fit an integer number of OFDM symbols 420 within the duration of a half subframe 410, the first symbol 430 of the half subframe 410 may have an excess cyclic prefix 432 that includes a normal or extended cyclic prefix 434 and a padding duration 436. For example, the padding duration 436 provided at the start of the first symbol 430 of the half subframe 410 generally has a fixed and constant length of 0.52 μs such that an integer number of OFDM symbols 420 can fit in the remaining 499.48 μs of the half subframe. For example, a 15 kHz subcarrier spacing is associated with a symbol length of approximately 66.67 μs and a normal cyclic prefix length of approximately 4.69 μs, whereby the padding duration at the start of the half subframe 410 allows 7 OFDM symbols 420 to fit within the duration of the half subframe 410. Accordingly, other symbols 440 in the half subframe (e.g., every symbol other than the first symbol 430) may include only a cyclic prefix and a symbol duration.

Although the padding duration serves an important purpose in ensuring that an integer number of OFDM symbols 420 fit in the duration of a half subframe 410, using the padding duration as an excess cyclic prefix 432 wastes resources in a time domain that could otherwise be utilized. For example, as described in further detail below with reference to FIGS. 6A-6B, a wireless node may use the padding duration to transmit a single carrier symbol that has a shorter length than a full symbol associated with a subcarrier spacing. Additionally, or alternatively, as described in further detail below with reference to FIG. 7, a wireless node may use the padding duration to adapt a transmit power or a receive gain in cases where the wireless node is configured to transmit or receive a signal in the first symbol 430 of a half subframe 410 that is associated with a different power level than a preceding symbol (e.g., the last symbol in the immediately preceding half subframe 410).

As indicated above, FIG. 4 is provided as an example. Other examples may differ from what is described with respect to FIG. 4.

FIG. 5 is a diagram illustrating examples of symbol, cyclic prefix, and padding durations associated with different subcarrier spacings. In particular, as shown, FIG. 5 illustrates a first table 500 that indicates symbol, cyclic prefix, and padding durations at subcarrier spacings up to 240 kHz and a second table 550 that indicates symbol, cyclic prefix, and padding durations at higher subcarrier spacings (e.g., 480 kHz and higher).

As shown in right-most column of the first table 500, an extra padding length that is provided at the start of every half subframe has a fixed and constant duration of 0.52 μs, which is independent of a subcarrier spacing. However, as further shown, a symbol length and a cyclic prefix length may generally depend on the subcarrier spacing. For example, a 15 kHz subcarrier spacing is associated with a symbol length of 66.67 μs and a cyclic prefix length of 4.69 μs such that seven (7) symbols can fit in the 0.5 ms duration of a half subframe at a subcarrier spacing of 15 kHz. In general, as shown, the symbol length and the cyclic prefix length proportionately scale to higher subcarrier spacings. For example, at a subcarrier spacing of 30 kHz, the symbol length and the cyclic prefix length is halved relative to a 15 kHz subcarrier spacing, which allows fourteen (14) symbols to fit within the same 0.5 ms duration of a half subframe. At lower subcarrier spacings, such as 60 kHz and below, the padding duration may occupy a relatively small amount of resources in a time domain relative to the cyclic prefix length and symbol duration. However, as shown at 505, the extra padding duration approaches the cyclic prefix length at a subcarrier spacing of 120 kHz and exceeds the cyclic prefix length at a subcarrier spacing of 240 kHz. Accordingly, the proportional amount of resources wasted by the extra padding may increase as the subcarrier spacing increases.

Furthermore, as shown in the second table 550, the proportional amount of resources wasted by the extra padding further increases at higher subcarrier spacings. For example, as shown, a larger subcarrier spacing of 480 kHz, 960 kHz, 1920 kHz, or 3840 kHz may be needed at higher carrier frequencies (e.g., in FR4) to support a larger maximum bandwidth with a fixed FFT size (shown in FIG. 5 as NFFT). Accordingly, at subcarrier spacings associated with higher carrier frequencies and/or higher maximum bandwidths, a chip duration, symbol length, cyclic prefix length, and/or extra padding length may be defined according to a time parameter, Tc, defined as 1/(480 kHz*4096), which equals approximately 0.509 nanoseconds (ns). Accordingly, as shown at 555, the extra padding duration provided at the start of every half subframe may have a fixed and constant length of 1024 Tc, which equals a full symbol duration at a subcarrier spacing of 1920 kHz and exceeds a full symbol duration at a subcarrier spacing of 3840 kHz.

Some aspects described herein therefore relate to techniques and apparatuses to utilize the padding duration at the start of every half subframe in order to avoid wasting time domain resources that may proportionately increase relative to a symbol length and a cyclic prefix length as a subcarrier spacing increases. For example, as described in further detail below with reference to FIGS. 6A-6B, a wireless node may use the padding duration to transmit a single carrier symbol that has a shorter length than a full symbol associated with a subcarrier spacing. Additionally, or alternatively, as described in further detail below with reference to FIG. 7, a wireless node may use the padding duration to adapt a transmit power or a receive gain in cases where the wireless node is configured to transmit or receive a signal in the first symbol 430 of a half subframe 410 that is associated with a different power level than a preceding symbol (e.g., the last symbol in the immediately preceding half subframe 410).

As indicated above, FIG. 5 is provided as an example. Other examples may differ from what is described with respect to FIG. 5.

Figure 6A:
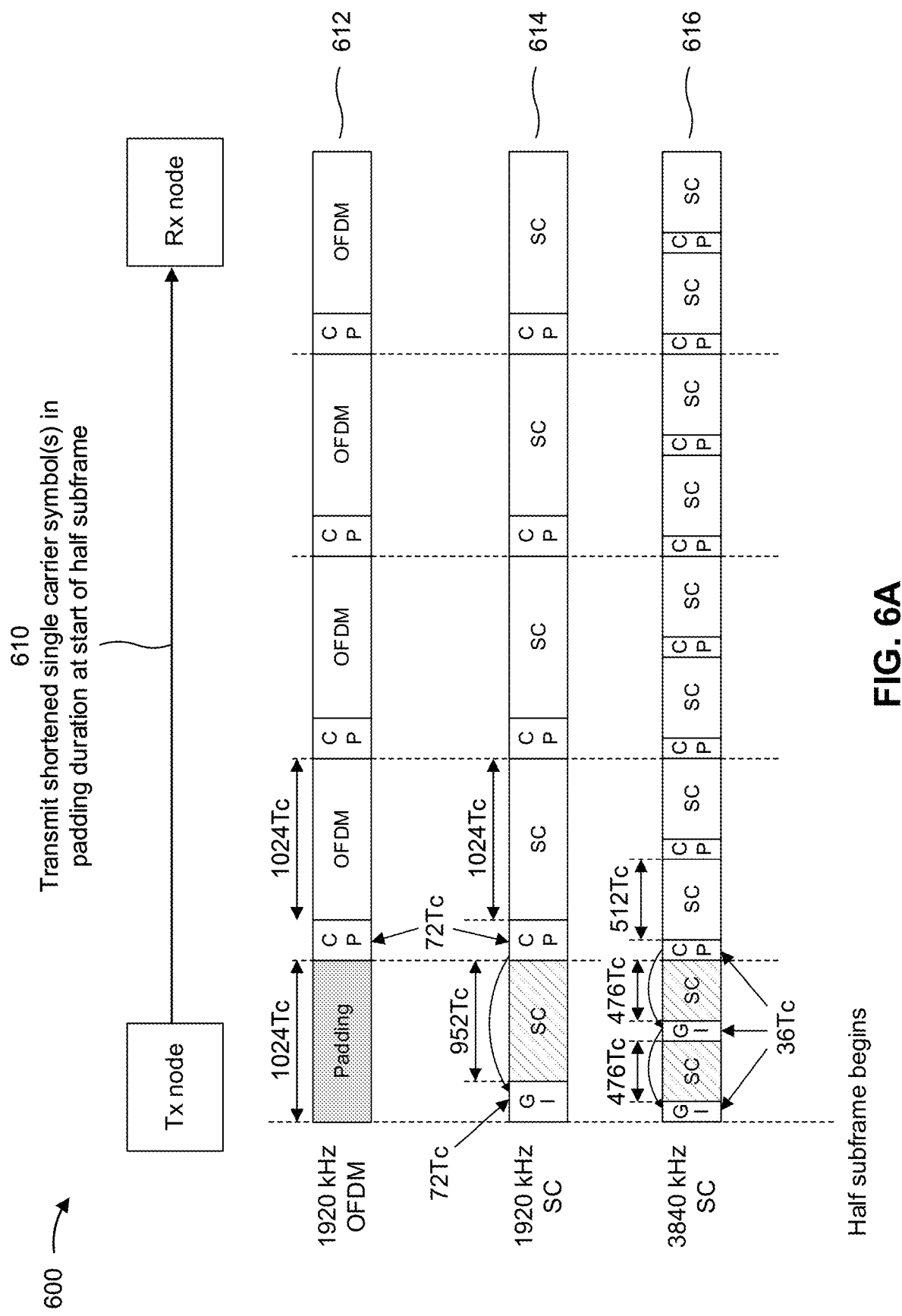
FIGS. 6A-6B are diagrams illustrating one or more examples associated with utilizing a padding duration at the start of a half subframe to transmit a shortened single carrier symbol that is preceded by a guard interval.
Figure 6B:
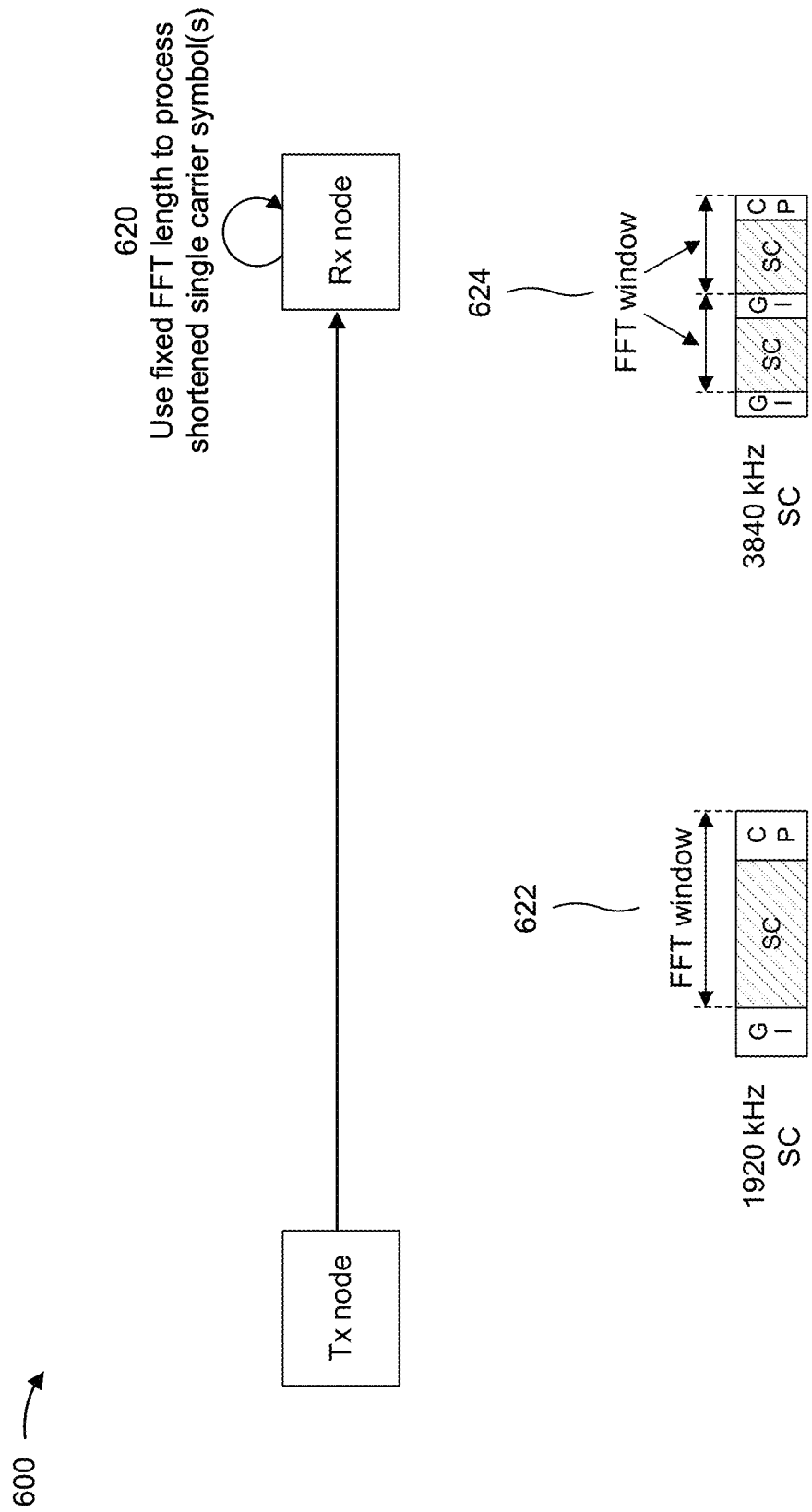

FIGS. 6A-6B are diagrams illustrating one or more examples 600 associated with utilizing a padding duration at the start of a half subframe to transmit a shortened single carrier symbol that is preceded by a guard interval. As shown in FIGS. 6A-6B, example(s) 600 includes communication between a transmitter wireless node (shown in FIGS. 6A-6B and referred to herein as Tx node) and a receiver wireless node (shown in FIGS. 6A-6B and referred to herein as Rx node). In some aspects, the Tx node and the Rx node may communicate in a wireless network, such as wireless network 100, via a wireless access link, which may include an uplink and a downlink. For example, in some aspects, the Rx node may be a UE (e.g., UE 120) and the Tx node may be a base station (e.g., base station 110) configured to transmit one or more downlink signals to the Rx node. Additionally, or alternatively, in some aspects, the Rx node may be a base station and the Tx node may be a UE configured to transmit one or more uplink signals to the Rx node.

In some aspects, at 610, the Tx node may transmit a shortened single carrier symbol to the Rx node in a padding duration at the start of a half subframe. For example, in some aspects, the Tx node and the Rx node may communicate using a carrier frequency that supports communication using OFDM waveforms and single carrier waveforms. For example, the OFDM waveform may provide high spectral efficiency, facilitate higher-order MIMO operations to achieve high data rates, and/or provide backward compatibility with different frequency ranges, and the single carrier waveform may be associated with a lower PAPR, a reduced effect of phase noise, and/or improved coverage relative to the OFDM waveform. Furthermore, the single carrier waveform may enable a time domain implementation without mandating an FFT or IFFT operation, whereby a single carrier waveform is not bound to a fixed FFT size.

In some aspects, to ensure coexistence between single carrier waveforms and OFDM or DFT-s-OFDM waveforms, the Tx node and the Rx node may communicate using a frame structure in which single carrier waveforms align with existing OFDM boundaries at a suitable granularity (e.g., single carrier waveforms may be aligned with OFDM boundaries at a frame, half frame, subframe, half subframe, slot, and/or symbol granularity). For example, at 612, a frame structure is shown for an OFDM waveform associated with a 1920 kHz subcarrier spacing. As described in further detail above, each symbol in the frame structure includes an OFDM symbol (e.g., having a symbol length of 1024 Tc at a subcarrier spacing of 1920 kHz) that is preceded by a cyclic prefix (e.g., having a length of 72 Tc at a subcarrier spacing of 1920 kHz. Furthermore, as described above and as shown in FIG. 6A, the first symbol of a half subframe includes a padding duration at the start of the half subframe to ensure that an integer number of symbols fit within the 0.5 ms duration of the half subframe, where the padding duration is equal to the symbol length at a subcarrier spacing of 1920 kHz.

In some aspects, as described above, the frame structure for the OFDM waveform may be aligned with a frame structure used for a single carrier waveform at regular intervals (e.g., every frame, half frame, subframe, half subframe, slot, and/or symbol), which enables the wireless network to dynamically switch a waveform allocated to a UE at regular intervals and/or enables flexibility to reallocate time and frequency resources among single carrier and OFDM/DFT-s-OFDM users at regular intervals, thereby improving resource utilization efficiency. For example, at 614, an example frame structure is shown for a single carrier waveform associated with a 1920 kHz subcarrier spacing. As shown, each symbol in the frame structure includes a single carrier symbol having the same symbol length as an OFDM symbol for the same subcarrier spacing that is preceded by a cyclic prefix having the same length as the cyclic prefix for the same subcarrier spacing. In this way, OFDM symbols and single carrier symbols may be aligned at symbol boundaries, and each symbol type may be preceded in a time domain by a cyclic prefix that is used to reduce inter-symbol interference, convert a linear convolution into a cyclic convolution, and/or enable low-complexity frequency domain equalization (FDE). Additionally, or alternatively, a single carrier waveform may be preceded by a guard interval that serves a similar function to a cyclic prefix.

In some aspects, in order to align boundaries of single carrier waveforms and OFDM waveforms at a subframe level or below (e.g., at a half subframe, slot, or symbol level), the frame structure that is used for the single carrier waveform may need to account for the excess cyclic prefix in the first symbol of every half subframe. For example, as described above, each half subframe starts with a padding duration having a constant length independent of a subcarrier spacing to ensure that an integer number of symbols fit within the 0.5 ms duration of the half subframe. Accordingly, in some cases, the frame structure used for single carrier waveforms may include a similar padding duration to ensure that an integer number of single carrier symbols fit within each half subframe. However, as described above, the padding duration represents wasted resources in a time domain, and therefore reduces resource utilization and increases latency (e.g., because no transmission can occur until after the padding duration has elapsed). In some aspects, as described herein, the Tx node may therefore use the padding duration to transmit a single carrier symbol having a duration that is shorter than a full symbol length associated with a given subcarrier spacing. For example, as described above, a single carrier symbol is not bound to a fixed FFT size, whereby a shorter single carrier symbol may be used in the padding duration to transmit information (e.g., a latency-sensitive signal, such as acknowledgement (ACK) or negative acknowledgement (NACK) feedback, ultra-reliable low-latency communication (URLLC) signaling, and/or semi-persistent or periodically scheduled data having a small payload size, among other examples) and thereby avoid wasting the time domain overhead of the padding duration.

For example, as shown at 614, the first symbol in the half subframe may include a single carrier symbol having a duration that is shorter than the full symbol length (e.g., at a 1920 kHz subcarrier spacing, the single carrier symbol transmitted in the padding duration at the start of the half subframe has a duration of 952 Tc, which is shorter than the 1024 Tc symbol length of a full single carrier symbol). Furthermore, as shown, the shortened single carrier symbol transmitted in the padding duration is preceded by a guard interval that has the same length as the cyclic prefix that precedes each full single carrier symbol (e.g., at a 1920 kHz subcarrier spacing, the guard interval that precedes the shortened single carrier symbol and the cyclic prefix that precedes each full single carrier symbol each have a duration of 72 Tc). In this way, because the guard interval has the same duration as the cyclic prefix that precedes the first full single carrier symbol (e.g., the guard interval is a repetition of the cyclic prefix that is copied over from the cyclic prefix preceding the next symbol), a cyclic property of the frame structure may be maintained. Furthermore, because the guard interval and the shortened single carrier symbol have a combined duration that is equal to the symbol length associated with the subcarrier spacing (e.g., 72 Tc+952 Tc=1024 Tc at a subcarrier spacing of 1920 kHz), the Rx node can use the same FFT size (e.g., 4096, or 4K) to successfully decode the shortened single carrier symbol and each full single carrier symbol.

In this way, using the padding duration to transmit a shortened single carrier symbol may increase utilization of time domain resources and/or allow the Tx node to send a latency-sensitive transmission earlier in a half subframe. For example, at subcarrier spacings where the padding duration is equal to or less than the symbol length for a full symbol (e.g., at 1920 kHz and below), the padding duration may be used to transmit a shortened single carrier symbol that has a shorter duration than the symbol length for a full symbol. Alternatively, at subcarrier spacings where the padding duration is greater than the symbol length for a full symbol (e.g., at 3840 kHz and above, where the padding duration is 1024 Tc and the symbol length is 512 Tc or below), multiple shortened single carrier symbols may be transmitted in the padding duration. For example, at 616, a frame structure is shown for a subcarrier spacing of 3840 kHz, where the symbol length for a full symbol is 512 Tc and a cyclic prefix preceding each full symbol is 36 Tc. In the example shown at 616, two single carrier symbols that have a shorter duration than the full symbol length (e.g., 476 Tc) may be transmitted in the padding duration, and each shortened single carrier symbol may be preceded by a guard interval that has a duration equal to the cyclic prefix length (e.g., 36 Tc). Accordingly, the Tx node may fit two shortened single carrier symbols within the padding duration when communicating using a carrier frequency associated with a subcarrier spacing of 3840 kHz, where each shortened single carrier symbol and corresponding guard interval has a combined duration equal to the full symbol length (e.g., 36 Tc+476 Tc=512 Tc at a subcarrier spacing of 3840 kHz). Alternatively, in cases where the padding duration is greater than the full symbol length associated with the subcarrier spacing, the Tx node may transmit one full single carrier symbol with a normal cyclic prefix and one shortened single carrier symbol with a guard interval in the padding duration.

Accordingly, as described herein, the shortened single carrier symbol(s) transmitted in the padding duration may be preceded by a guard interval that has the same duration as the cyclic prefix preceding the first full symbol, and the shortened single carrier symbol(s) and the corresponding guard interval(s) may have a combined duration that equals the full symbol length for the subcarrier spacing. In this way, the frame structure may have a cyclic format despite the shortened single carrier symbol(s) transmitted in the padding duration. Furthermore, as shown in FIG. 6B, at 620, and the relative durations of the guard interval, the cyclic prefix, the shortened single carrier symbol, and the full symbol length may enable the Rx node to use a fixed FFT length to process the shortened single carrier symbol(s) transmitted in the padding duration. For example, as described above with reference to FIG. 5, a subcarrier spacing may increase proportionally as the maximum bandwidth of a carrier frequency increases in order to maintain a fixed FFT size, which is limited to 4K or 4096 to limit computational complexity. Accordingly, in order to maintain the fixed FFT length that is used to process the shortened single carrier symbols and the full single carrier symbols, the Rx node may process each shortened single carrier symbol using an FFT window that includes the shortened single carrier symbol and the guard interval or cyclic prefix that follows the shortened single carrier symbol. For example, as shown at 622, the Rx node may process the shortened single carrier symbol at a subcarrier spacing of 1920 kHz using an FFT window that includes the shortened single carrier symbol and the cyclic prefix that follows the shortened single carrier symbol, which have a combined duration equal to the first full single carrier symbol (e.g., 1024 Tc at a subcarrier spacing of 1920 kHz). In another example, as shown at 624, the Rx node may process two shortened single carrier symbols at a subcarrier spacing of 3840 kHz using an FFT window that includes a shortened single carrier symbol and the guard interval or cyclic prefix that follows the shortened single carrier symbol, which have a combined duration equal to the first full single carrier symbol (e.g., 512 Tc at a subcarrier spacing of 3840 kHz).

As indicated above, FIGS. 6A-6B are provided as one or more examples. Other examples may differ from what is described with respect to FIGS. 6A-6B.

Figure 7:
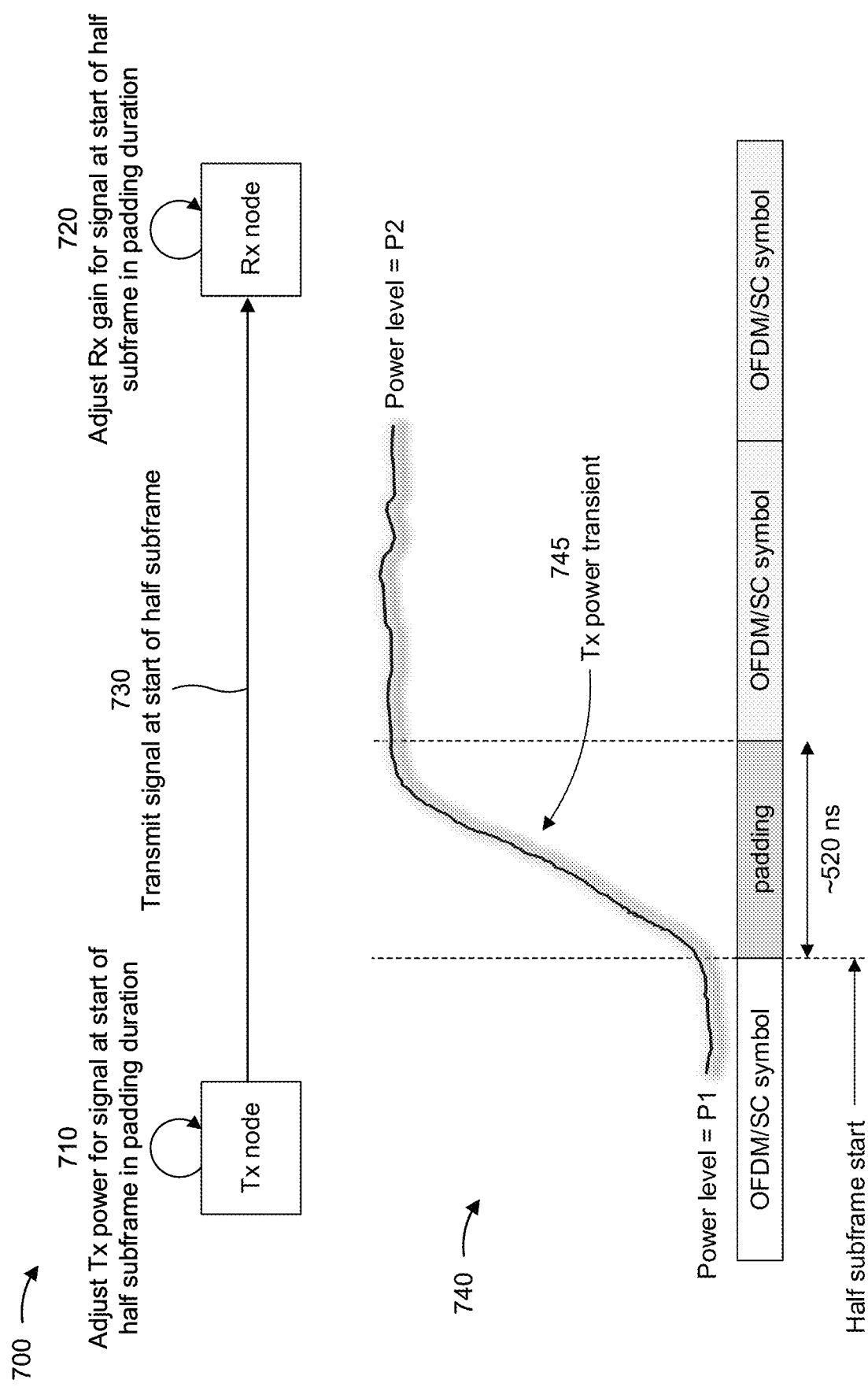
FIG. 7 is a diagram illustrating an example associated with utilizing a padding duration at the start of a half subframe to handle a power transient.

FIG. 7 is a diagram illustrating an example associated with utilizing a padding duration at the start of a half subframe to handle a power transient. As shown in FIG. 7, example 700 includes communication between a transmitter wireless node (shown in FIG. 7 and referred to herein as Tx node) and a receiver wireless node (shown in FIG. 7 and referred to herein as Rx node). In some aspects, the Tx node and the Rx node may communicate in a wireless network, such as wireless network 100, via a wireless access link, which may include an uplink and a downlink. For example, in some aspects, the Rx node may be a UE (e.g., UE 120) and the Tx node may be a base station (e.g., base station 110) configured to transmit one or more downlink signals to the Rx node. Additionally, or alternatively, in some aspects, the Rx node may be a base station and the Tx node may be a UE configured to transmit one or more uplink signals to the Rx node.

In some aspects, at 710, the Tx node may adjust a transmit power for a signal scheduled in the first symbol of a half subframe in a padding duration at the start of the half subframe. For example, in some aspects, the Tx node may use the padding duration to adjust a transmit power in cases where the signal that the Tx node is configured to transmit in the first symbol of the half subframe is associated with a different power level than an immediately preceding symbol in time (e.g., the last symbol in an immediately preceding half subframe). Furthermore, at 720, the Rx node may adjust a receive gain for the signal scheduled in the first symbol of the half subframe in the padding duration at the start of the half subframe. For example, in some aspects, the Rx node may use the padding duration to adjust the receive gain in cases where the signal that the Rx node is configured to receive in the first symbol of the half subframe is associated with a different power level than the immediately preceding symbol in time. At 730, the Tx node may then transmit, and the UE may receive, the signal at the start of the half subframe (e.g., in the first symbol of the symbol of the half subframe, after the padding duration).

For example, in some aspects, the signal scheduled in the first symbol of the half subframe may be associated with a power change event (relative to the last symbol that immediately precedes the first symbol of the half subframe in time) in cases where a base station requests a UE to transmit using a higher or lower power level on one or more data symbols based on an MCS that the base station configures for the one or more data symbols. In other examples, the signal scheduled in the first symbol of the half subframe may be associated with a power change event causing the signal to be associated with a different power level than the immediately preceding symbol in cases where the UE adjusts an automatic gain control to adjust to a higher or lower received power, interference, and/or noise level. Additionally, or alternatively, the power change event may be triggered for the signal scheduled in the first symbol of the half subframe in cases where a UE retransmits a RACH with an increased transmit power, a UE transmits or receives a reference signal with a power level that differs from a data symbol, and/or the Tx node (which may be a base station or a UE) adjusts a transmit power for any other reason such as a bandwidth part switch, a power-spectral density limitation, and/or a maximum permissible exposure limitation, among other examples.

Accordingly, in cases where a base station or a UE needs to adapt a transmit power and/or a receive gain, the transmit power and/or receive gain may be configured to be adjusted in the padding duration that occurs at the start of a half subframe. In this way, the padding duration can be used to handle a power transient that may occur while communication hardware is stabilizing the transmit power and/or the receive gain. For example, as shown at 740, an OFDM symbol or a single carrier symbol may be scheduled in the first symbol of a half subframe, subsequent to the ~520 ns padding duration at the start of a half subframe. In the illustrated example, the OFDM symbol or single carrier symbol scheduled in the first symbol of the half subframe may be associated with a power level (P2) that is higher than a power level (P1) associated with an immediately preceding symbol (e.g., the last symbol in the immediately preceding half subframe). Accordingly, the Tx node and the Rx node may start to operate at the power level associated with the signal scheduled in the first symbol of the half subframe in the padding duration, such that a Tx power transient 745 occurs during the padding duration. For example, the Tx node may adjust the transmit power and the Rx node may adjust the receive gain in the padding duration, rather than waiting until the starting boundary of the first symbol in the half subframe to adjust the transmit power and/or receive gain.

For example, in cases where the Tx node is a UE configured to transmit a signal in the first symbol at the start of a half subframe using a power level that is different (e.g., higher or lower) than an immediately preceding symbol in time (e.g., a power change event is aligned with a half subframe boundary), a base station (acting as the Rx node for the signal scheduled in the first symbol at the start of a half subframe) may provide, to the UE, an indication that the UE may use the padding duration at the start of the half subframe to adjust the transmit power. For example, in some aspects, the indication may be transmitted by the base station and received by the UE in a downlink control information (DCI) message, a medium access control (MAC) control element (MAC-CE), and/or a radio resource control (RRC) message. Additionally, or alternatively, the indication may be implicit, whereby the UE may be permitted to always use the padding duration to adapt a transmit power for an upcoming symbol. In such cases, the UE may use the padding duration to adapt the transmit power based on the power change event that is aligned with the boundary of the half subframe. Furthermore, in cases where the Tx node is a UE, the base station may include the padding duration when calculating the time when the transmission by the UE is to start in order to decide a resource allocation for the transmission (e.g., time and frequency resources allocated to the transmission).

Additionally, or alternatively, in cases where the Tx node is a base station and the Rx node is a UE configured to receive a signal from the Tx node in the first symbol at the start of a half subframe using a power level that is different than the immediately preceding symbol, the base station may determine a resource allocation for the UE based at least in part on a power transition time for the UE during the padding duration (e.g., the base station may move the resource allocation for the UE earlier in time based on the amount of time that the UE needs to change the receive gain). Furthermore, in such cases, the base station (acting as the Tx node for the signal scheduled in the first symbol at the start of a half subframe) may provide, to the UE, an indication that the UE may use the padding duration at the start of the half subframe to adjust the receive gain. For example, in some aspects, the indication may be transmitted by the base station and received by the UE in a DCI message, a MAC-CE, and/or an RRC message. Additionally, or alternatively, the indication may be implicit, whereby the UE may be permitted to always use the padding duration to adapt a receive gain for an upcoming symbol. In such cases, the UE may use the padding duration to adapt the receive gain based on the power change event for the received signal that is aligned with the boundary of the half subframe.

In this way, the padding duration may be used to handle a power transient when one or more power change events are aligned with the boundary of a half subframe. In this way, the time domain resources occupied by the padding duration may be utilized to save over-the-air resources during the symbol time that may otherwise be needed to absorb the power transient. Additionally, or alternatively, using the padding duration to adjust the transmit power and/or receive gain for the signal scheduled in the first symbol of a half subframe may provide extra time (e.g., ~520 ns) to the time that is available to ramp power up or down. For example, a wireless network may be associated with a requirement (e.g., specified in a wireless communication standard) that an on or off power transition for various signals (e.g., a PRACH, SRS, PUCCH, and/or PUSCH, among other examples) must occur within 5 μs for a carrier frequency in FR2 or within 10 μs for a carrier frequency in FR1. Accordingly, the 0.52 μs padding duration may increase the available time to effectuate a transmit power and/or a receive gain change by more than 10% for FR2 and by more than 5% for FR1, which can be an important time savings especially as hardware speed for power switches increases and only a small amount of time (e.g., a few microseconds) is needed for power switching. For example, the time savings realized by utilizing the padding duration to handle a transmit power and/or receive gain power transient may increase as hardware speed increases, which may lead to a reduction in regulatory requirements for power switching time (e.g., to a value below 5 μs, in which case the 0.52 μs padding duration may represent more than 10% of the time that is allocated for power switching.

As indicated above, FIG. 7 is provided as an example. Other examples may differ from what is described with respect to FIG. 7.

Figure 8:
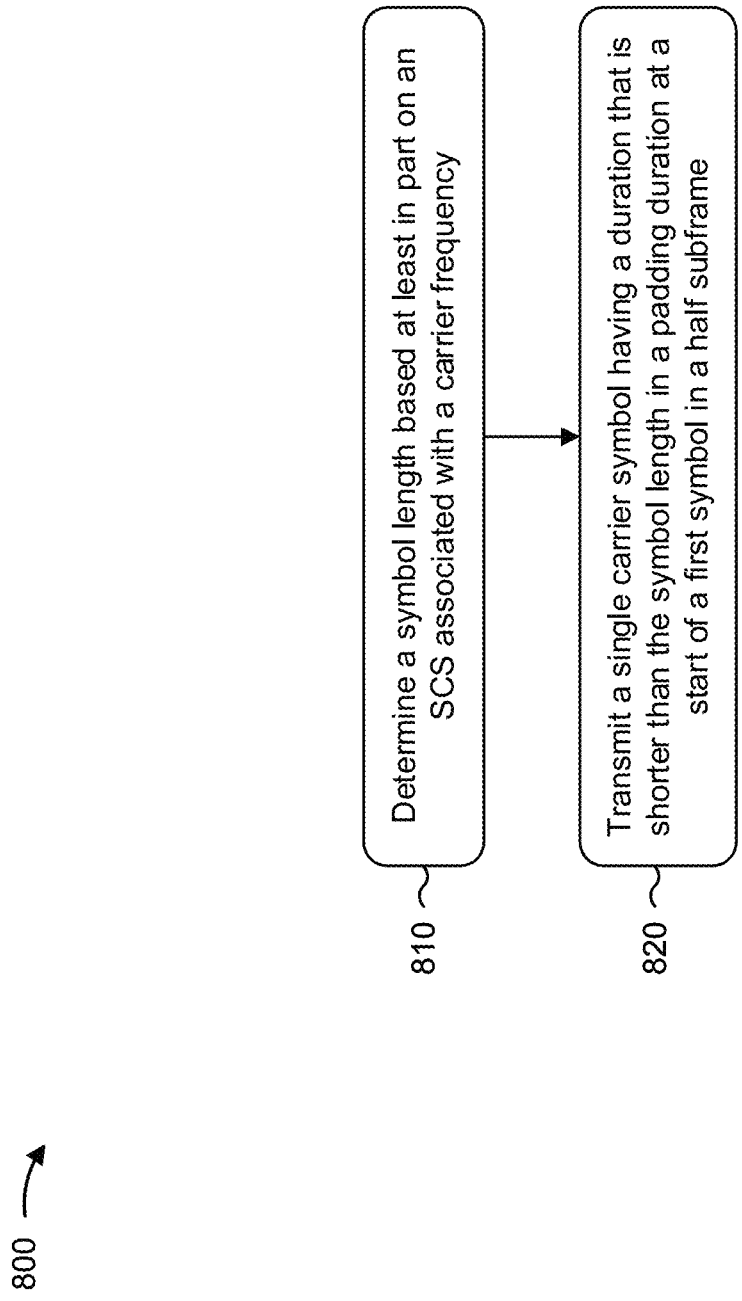
FIGS. 8-9 are flowcharts of example methods of wireless communication.

FIG. 8 is a flowchart of an example method 800 of wireless communication. The method 800 may be performed by, for example, a wireless node (e.g., base station 110 and/or UE 120).

At 810, the wireless node may determine a symbol length based at least in part on a subcarrier spacing associated with a carrier frequency. For example, the wireless node (e.g., using communication manager 140/150 and/or determination component 1008, depicted in FIG. 10) may determine a symbol length based at least in part on a subcarrier spacing associated with a carrier frequency, as described above in connection with, for example, FIG. 6A and at 610.

At 820, the wireless node may transmit a single carrier symbol having a duration that is shorter than the symbol length in a padding duration at a start of a first symbol in a half subframe. For example, the wireless node (e.g., using communication manager 140/150 and/or transmission component 1004, depicted in FIG. 10) may transmit a single carrier symbol having a duration that is shorter than the symbol length in a padding duration at a start of a first symbol in a half subframe, as described above in connection with, for example, FIG. 6A and at 610. In some aspects, the single carrier symbol transmitted in the padding duration is preceded by a guard interval. In some aspects, the guard interval has a duration equal to a cyclic prefix length associated with the subcarrier spacing. In some aspects, the single carrier symbol and the guard interval have a combined duration equal to the symbol length. In some aspects, the padding duration has a length that is independent of the subcarrier spacing associated with the carrier frequency. In some aspects, the single carrier symbol is associated with an FFT window that includes a guard interval or a cyclic prefix that follows the single carrier symbol. In some aspects, the single carrier symbol transmitted in the padding duration is used to transmit a latency-sensitive signal.

In some aspects, method 800 includes transmitting, in the padding duration at the start of the first symbol in the half subframe, an additional single carrier symbol having the duration that is shorter than the symbol length, wherein the additional single carrier symbol is transmitted in the padding duration based at least in part on the length of the padding duration being greater than the symbol length associated with the subcarrier spacing.

In some aspects, method 800 includes transmitting, in the padding duration at the start of the first symbol in the half subframe, a full single carrier symbol having a duration that is equal to the symbol length, wherein the full single carrier symbol is transmitted in the padding duration based at least in part on the length of the padding duration being greater than the symbol length associated with the subcarrier spacing.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
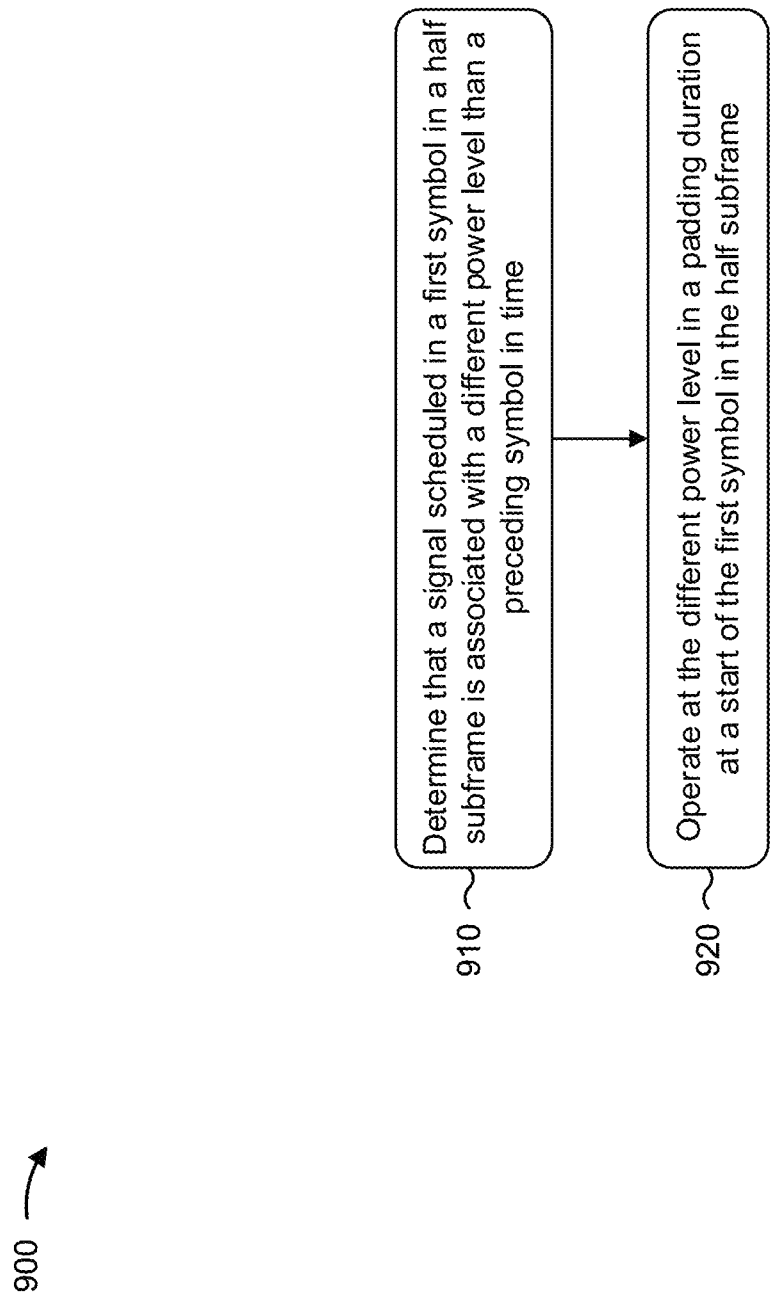

FIG. 9 is a flowchart of an example method 900 of wireless communication. The method 900 may be performed by, for example, a wireless node (e.g., base station 110 and/or UE 120).

At 910, the wireless node may determine that a signal scheduled in a first symbol in a half subframe is associated with a different power level than a preceding symbol in time. For example, the wireless node (e.g., using communication manager 140/150 and/or determination component 1108, depicted in FIG. 11) may determine that a signal scheduled in a first symbol in a half subframe is associated with a different power level than a preceding symbol in time, as described above in connection with, for example, FIG. 7 and at 710, 720. In some aspects, the signal is an OFDM symbol or a single carrier symbol.

At 920, the wireless node may operate at the different power level in a padding duration at a start of the first symbol in the half subframe. For example, the wireless node (e.g., using communication manager 140/150 and/or operation component 1110, depicted in FIG. 11) may operate at the different power level in a padding duration at a start of the first symbol in the half subframe, as described above in connection with, for example, FIG. 7 and at 710, 720. In some aspects, operating at the different power level comprises adjusting a transmit power associated with the signal scheduled in the first symbol in the padding duration at the start of the first symbol in the half subframe. In some aspects, a resource allocation associated with the signal scheduled in the first symbol is based at least in part on the padding duration. In some aspects, operating at the different power level comprises adjusting a receive gain associated with the signal scheduled in the first symbol in the padding duration at the start of the first symbol in the half subframe.

In some aspects, method 900 includes receiving an indication to adapt a transmit power or a receive gain for the signal scheduled in the first symbol in the half subframe in the padding duration at the start of the first symbol in the half subframe. In some aspects, the indication is received in a DCI message, a MAC-CE, or an RRC message. In some aspects, method 900 includes using the padding duration at the start of the first symbol in the half subframe to adapt a transmit power or a receive gain for the signal scheduled in the first symbol in the half subframe based at least in part on the padding duration at the start of the first symbol in the half subframe.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
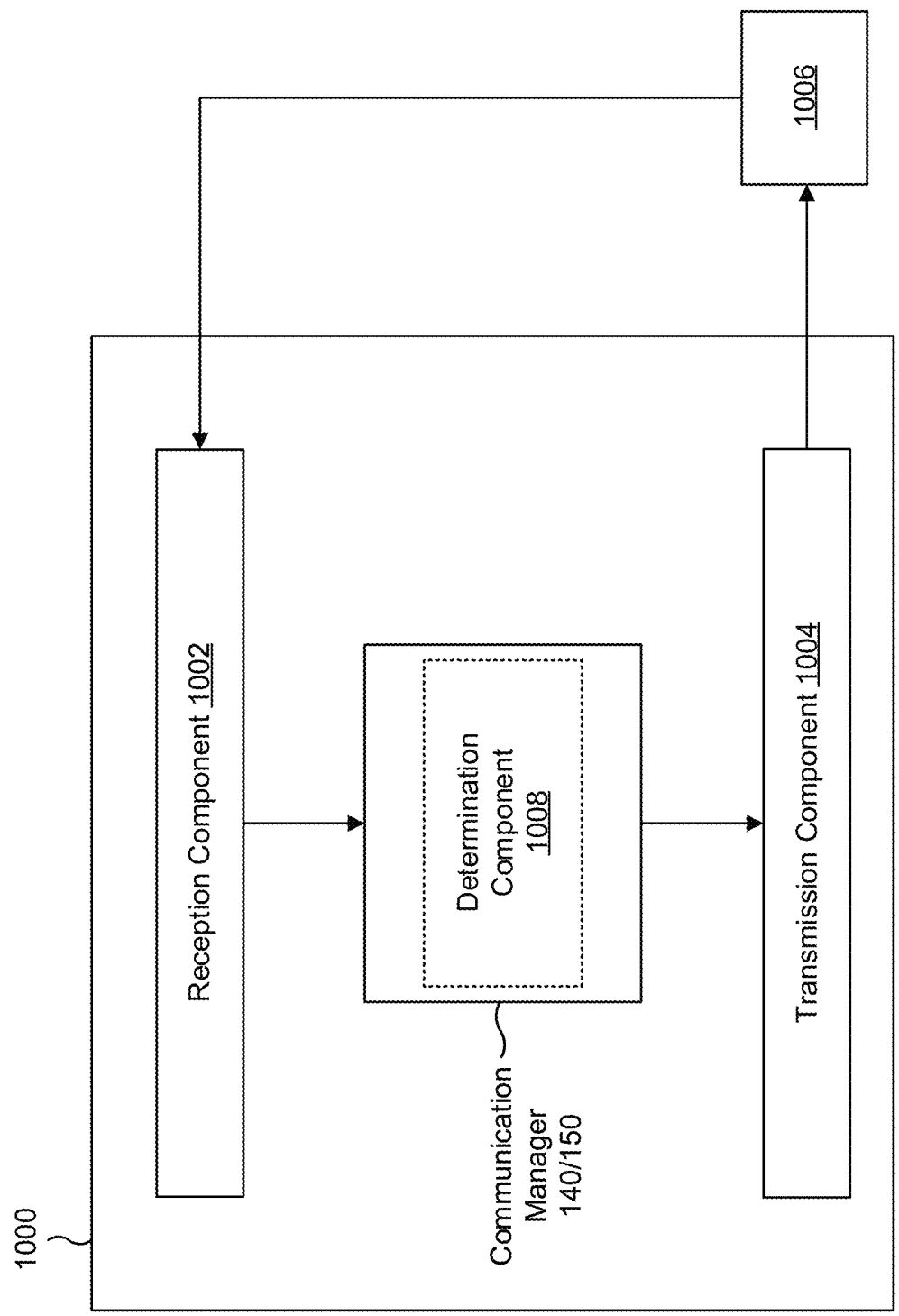
FIGS. 10-11 are block diagrams of example apparatuses for wireless communication.

FIG. 10 is a block diagram of an example apparatus 1000 for wireless communication. The apparatus 1000 may be a wireless node, or a wireless node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140 and/or the communication manager 150 shown in FIGS. 1-2 (shown as communication manager 140/150). The communication manager 140/150 may include a determination component 1008, among other examples.

In some aspects, the apparatus 1000 may be configured to perform one or more operations described herein in connection with FIGS. 6A-6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station and/or the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station and/or the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station and/or the UE described above in connection with FIG. 2. In some aspects, the transmission component 1004 may be co-located with the reception component 1002 in a transceiver.

The determination component 1008 may determine a symbol length based at least in part on a subcarrier spacing associated with a carrier frequency. The transmission component 1004 may transmit a single carrier symbol having a duration that is shorter than the symbol length in a padding duration at a start of a first symbol in a half subframe.

The transmission component 1004 may transmit, in the padding duration at the start of the first symbol in the half subframe, an additional single carrier symbol having the duration that is shorter than the symbol length, wherein the additional single carrier symbol is transmitted in the padding duration based at least in part on the length of the padding duration being greater than the symbol length associated with the subcarrier spacing.

The transmission component 1004 may transmit, in the padding duration at the start of the first symbol in the half subframe, a full single carrier symbol having a duration that is equal to the symbol length, wherein the full single carrier symbol is transmitted in the padding duration based at least in part on the length of the padding duration being greater than the symbol length associated with the subcarrier spacing.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
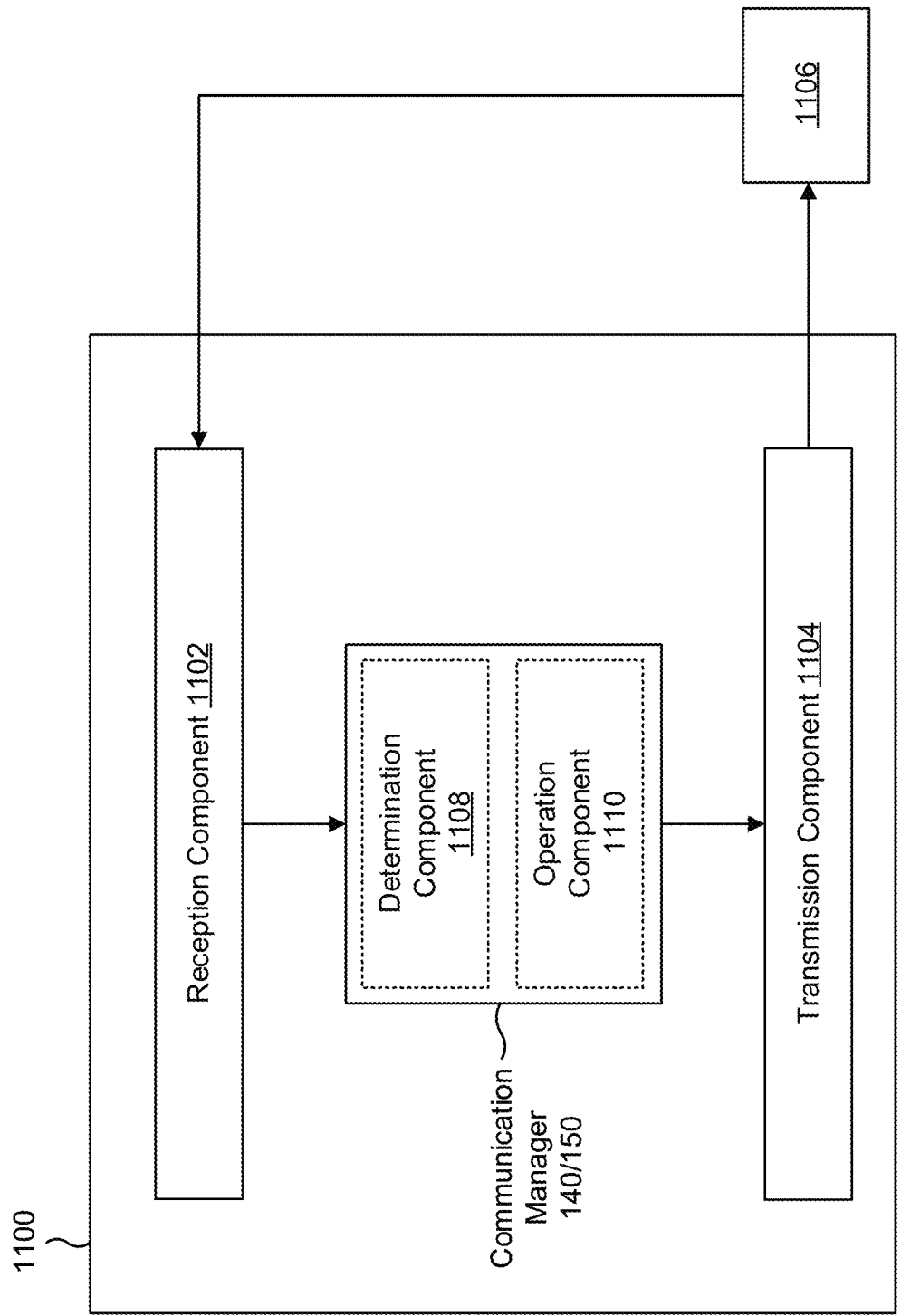

FIG. 11 is a block diagram of an example apparatus 1100 for wireless communication. The apparatus 1100 may be a wireless node, or a wireless node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140 and/or the communication manager 150 shown in FIGS. 1-2 (shown as communication manager 140/150). The communication manager 140/150 may include one or more of a determination component 1108 or an operation component 1110, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station and/or the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station and/or the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station and/or the UE described above in connection with FIG. 2. In some aspects, the transmission component 1104 may be co-located with the reception component 1102 in a transceiver.

The determination component 1108 may determine that a signal scheduled in a first symbol in a half subframe is associated with a different power level than a preceding symbol in time. The operation component 1110 may operate at the different power level in a padding duration at a start of the first symbol in the half subframe.

The reception component 1102 may receive an indication to adapt a transmit power or a receive gain for the signal scheduled in the first symbol in the half subframe in the padding duration at the start of the first symbol in the half subframe.

The operation component 1110 may use the padding duration at the start of the first symbol in the half subframe to adapt a transmit power or a receive gain for the signal scheduled in the first symbol in the half subframe based at least in part on the padding duration at the start of the first symbol in the half subframe.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
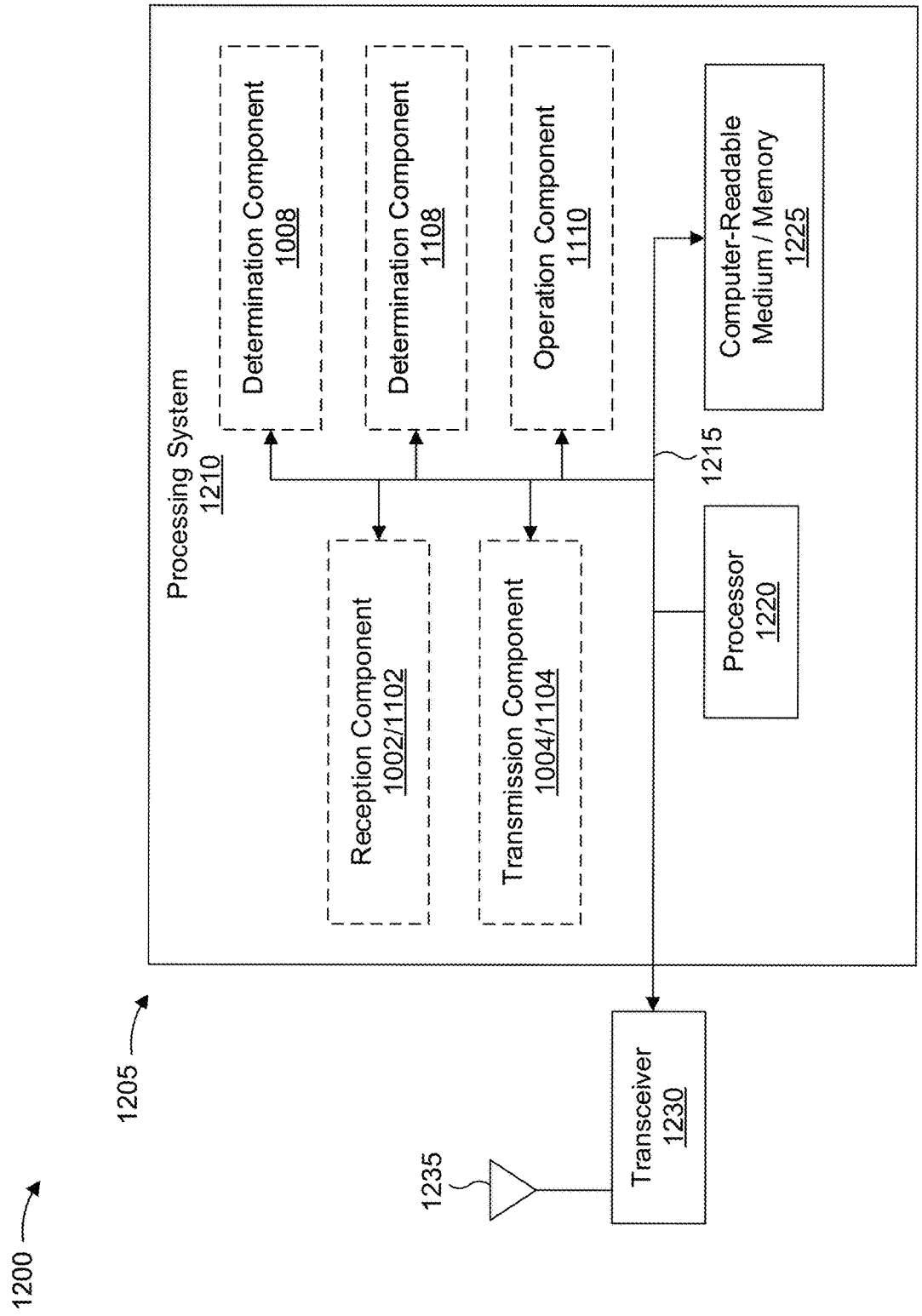
FIG. 12 is a diagram illustrating an example of a hardware implementation for an apparatus employing a processing system.

FIG. 12 is a diagram illustrating an example 1200 of a hardware implementation for an apparatus 1205 employing a processing system 1210. The apparatus 1205 may be a wireless node.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1002/1102. In addition, the transceiver 1230 receives information from the processing system 1210, specifically the transmission component 1004/1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the UE 120 and may include the memory 282 and/or at least one of the TX MIMO processor 266, the RX processor 258, and/or the controller/processor 280. Additionally, or alternatively, the processing system 1210 may be a component of the base station 110 and may include the memory 242 and/or at least one of the TX MIMO processor 230, the RX processor 238, and/or the controller/processor 240. In some aspects, the apparatus 1205 for wireless communication includes means for determining a symbol length based at least in part on a subcarrier spacing associated with a carrier frequency; and means for transmitting a single carrier symbol having a duration that is shorter than the symbol length in a padding duration at a start of a first symbol in a half subframe. The aforementioned means may be one or more of the aforementioned components of the apparatus 1000 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

In some aspects, the processing system 1210 may be a component of the UE 120 and may include the memory 282 and/or at least one of the TX MIMO processor 266, the RX processor 258, and/or the controller/processor 280. Additionally, or alternatively, the processing system 1210 may be a component of the base station 110 and may include the memory 242 and/or at least one of the TX MIMO processor 230, the RX processor 238, and/or the controller/processor 240. In some aspects, the apparatus 1205 for wireless communication includes means for determining that a signal scheduled in a first symbol in a half subframe is associated with a different power level than a preceding symbol in time; and means for operate at the different power level in a padding duration at a start of the first symbol in the half subframe. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a wireless node, comprising: determining a symbol length based at least in part on a subcarrier spacing associated with a carrier frequency; and transmitting a single carrier symbol having a duration that is shorter than the symbol length in a padding duration at a start of a first symbol in a half subframe.

Aspect 2: The method of Aspect 1, wherein the single carrier symbol transmitted in the padding duration is preceded by a guard interval.

Aspect 3: The method of Aspect 2, wherein the guard interval has a duration equal to a cyclic prefix length associated with the subcarrier spacing.

Aspect 4: The method of any of Aspects 2-3, wherein the single carrier symbol and the guard interval have a combined duration equal to the symbol length.

Aspect 5: The method of any of Aspects 1-4, wherein the padding duration has a length that is independent of the subcarrier spacing associated with the carrier frequency.

Aspect 6: The method of any of Aspects 1-5, further comprising: transmitting, in the padding duration at the start of the first symbol in the half subframe, an additional single carrier symbol having the duration that is shorter than the symbol length, wherein the additional single carrier symbol is transmitted in the padding duration based at least in part on the length of the padding duration being greater than the symbol length associated with the subcarrier spacing.

Aspect 7: The method of any of Aspects 1-5, further comprising: transmitting, in the padding duration at the start of the first symbol in the half subframe, a full single carrier symbol having a duration that is equal to the symbol length, wherein the full single carrier symbol is transmitted in the padding duration based at least in part on the length of the padding duration being greater than the symbol length associated with the subcarrier spacing.

Aspect 8: The method of any of Aspects 1-7, wherein the single carrier symbol is associated with an FFT window that includes a guard interval or a cyclic prefix that follows the single carrier symbol.

Aspect 9: The method of any of Aspects 1-8, wherein the single carrier symbol transmitted in the padding duration is used to transmit a latency-sensitive signal.

Aspect 10: A method of wireless communication performed by a wireless node, comprising: determining that a signal scheduled in a first symbol in a half subframe is associated with a different power level than a preceding symbol in time; and operating at the different power level in a padding duration at a start of the first symbol in the half subframe.

Aspect 11: The method of Aspect 10, wherein operating at the different power level comprises: adjusting a transmit power associated with the signal scheduled in the first symbol in the padding duration at the start of the first symbol in the half subframe.

Aspect 12: The method of any of Aspects 10-11, wherein a resource allocation associated with the signal scheduled in the first symbol is based at least in part on the padding duration.

Aspect 13: The method of any of Aspect 10, wherein operating at the different power level comprises: adjusting a receive gain associated with the signal scheduled in the first symbol in the padding duration at the start of the first symbol in the half subframe.

Aspect 14: The method of any of Aspects 10-13, further comprising: receiving an indication to adapt a transmit power or a receive gain for the signal scheduled in the first symbol in the half subframe in the padding duration at the start of the first symbol in the half subframe.

Aspect 15: The method of Aspect 14, wherein the indication is received in a DCI message, a MAC-CE, or an RRC message.

Aspect 16: The method of any of Aspects 10-15, further comprising: using the padding duration at the start of the first symbol in the half subframe to adapt a transmit power or a receive gain for the signal scheduled in the first symbol in the half subframe based at least in part on the padding duration at the start of the first symbol in the half subframe.

Aspect 17: The method of any of Aspects 10-16, wherein the signal is an OFDM symbol or a single carrier symbol.

Aspect 18: An apparatus for wireless communication at a device, comprising a processor; memory coupled with the processor; and instructions stored in the memory and executable by the processor to cause the apparatus to perform the method of any of Aspects 1-9.

Aspect 19: A device for wireless communication, comprising a memory and one or more processors coupled to the memory, the memory and the one or more processors configured to perform the method of any of Aspects 1-9.

Aspect 20: An apparatus for wireless communication, comprising at least one means for performing the method of any of Aspects 1-9.

Aspect 21: A non-transitory computer-readable medium storing code for wireless communication, the code comprising instructions executable by a processor to perform the method of any of Aspects 1-9.

Aspect 22: A non-transitory computer-readable medium storing a set of instructions for wireless communication, the set of instructions comprising one or more instructions that, when executed by one or more processors of a device, cause the device to perform the method of any of Aspects 1-9.

Aspect 23: An apparatus for wireless communication at a device, comprising a processor; memory coupled with the processor; and instructions stored in the memory and executable by the processor to cause the apparatus to perform the method of any of Aspects 10-17.

Aspect 24: A device for wireless communication, comprising a memory and one or more processors coupled to the memory, the memory and the one or more processors configured to perform the method of any of Aspects 10-17.

Aspect 25: An apparatus for wireless communication, comprising at least one means for performing the method of any of Aspects 10-17.

Aspect 26: A non-transitory computer-readable medium storing code for wireless communication, the code comprising instructions executable by a processor to perform the method of any of Aspects 10-17.

Aspect 27: A non-transitory computer-readable medium storing a set of instructions for wireless communication, the set of instructions comprising one or more instructions that, when executed by one or more processors of a device, cause the device to perform the method of any of Aspects 10-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
    a memory; and
    one or more processors, coupled to the memory, configured to:
        determine a symbol length based at least in part on a subcarrier spacing associated with a carrier frequency; and
        transmit a single carrier symbol having a duration that is shorter than the symbol length in a padding duration at a start of a first symbol in a half subframe.

2. The wireless node of claim 1, wherein the single carrier symbol transmitted in the padding duration is preceded by a guard interval.

3. The wireless node of claim 2, wherein the guard interval has a duration equal to a cyclic prefix length associated with the subcarrier spacing.

4. The wireless node of claim 2, wherein the single carrier symbol and the guard interval have a combined duration equal to the symbol length.

5. The wireless node of claim 1, wherein the padding duration has a length that is independent of the subcarrier spacing associated with the carrier frequency.

6. The wireless node of claim 5, wherein the one or more processors are further configured to:
transmit, in the padding duration at the start of the first symbol in the half subframe, an additional single carrier symbol having the duration that is shorter than the symbol length, wherein the additional single carrier symbol is transmitted in the padding duration based at least in part on the length of the padding duration being greater than the symbol length associated with the subcarrier spacing.

7. The wireless node of claim 5, wherein the one or more processors are further configured to:
transmit, in the padding duration at the start of the first symbol in the half subframe, a full single carrier symbol having a duration that is equal to the symbol length, wherein the full single carrier symbol is transmitted in the padding duration based at least in part on the length of the padding duration being greater than the symbol length associated with the subcarrier spacing.

8. The wireless node of claim 1, wherein the single carrier symbol is associated with a Fast Fourier Transform window that includes a guard interval or a cyclic prefix that follows the single carrier symbol.

9. The wireless node of claim 1, wherein the single carrier symbol transmitted in the padding duration is used to transmit a latency-sensitive signal.

10. A method of wireless communication performed by a wireless node, comprising:
determining a symbol length based at least in part on a subcarrier spacing associated with a carrier frequency; and
transmitting a single carrier symbol having a duration that is shorter than the symbol length in a padding duration at a start of a first symbol in a half subframe.

11. The method of claim 10, wherein the single carrier symbol transmitted in the padding duration is preceded by a guard interval.

12. The method of claim 11, wherein the guard interval has a duration equal to a cyclic prefix length associated with the subcarrier spacing.

13. The method of claim 11, wherein the single carrier symbol and the guard interval have a combined duration equal to the symbol length.

14. The method of claim 10, further comprising:
transmitting, in the padding duration at the start of the first symbol in the half subframe, an additional single carrier symbol having the duration that is shorter than the symbol length or a full single carrier symbol having a duration that is equal to the symbol length, wherein the additional single carrier symbol or the full single carrier symbol is transmitted in the padding duration based at least in part on the length of the padding duration being greater than the symbol length associated with the subcarrier spacing.

15. The method of claim 10, wherein the single carrier symbol is associated with a Fast Fourier Transform window that includes a guard interval or a cyclic prefix that follows the single carrier symbol.

16. A non-transitory computer-readable medium storing a set of instructions for wireless communication performed by a wireless node, the set of instructions comprising:
one or more instructions that, when executed by one or more processors of a wireless node, cause the wireless node to:
determine a symbol length based at least in part on a subcarrier spacing associated with a carrier frequency; and
transmit a single carrier symbol having a duration that is shorter than the symbol length in a padding duration at a start of a first symbol in a half subframe.

17. An apparatus for wireless communication, comprising:
means for determining a symbol length based at least in part on a subcarrier spacing associated with a carrier frequency; and
means for transmitting a single carrier symbol having a duration that is shorter than the symbol length in a padding duration at a start of a first symbol in a half subframe.

* * * * *